United States Patent
Domori

(10) Patent No.: US 9,868,170 B2
(45) Date of Patent: Jan. 16, 2018

(54) WIRE ELECTRICAL DISCHARGE MACHINING APPARATUS AND MACHINING METHOD

(71) Applicant: Mitsubishi Electric Corporation, Tokyo (JP)

(72) Inventor: Yuhei Domori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/127,828

(22) PCT Filed: Mar. 24, 2014

(86) PCT No.: PCT/JP2014/058019
§ 371 (c)(1),
(2) Date: Sep. 21, 2016

(87) PCT Pub. No.: WO2015/145529
PCT Pub. Date: Oct. 1, 2015

(65) Prior Publication Data
US 2017/0095869 A1    Apr. 6, 2017

(51) Int. Cl.
*B23H 7/06*    (2006.01)
*B23H 7/20*    (2006.01)

(52) U.S. Cl.
CPC ............. *B23H 7/06* (2013.01); *B23H 7/20* (2013.01)

(58) Field of Classification Search
CPC ............ B23H 7/06; B23H 7/065; B23H 7/20
See application file for complete search history.

(56) References Cited

U.S. PATENT DOCUMENTS

| 4,736,086 A | 4/1988 | Obara | |
| 5,012,063 A * | 4/1991 | Kawanabe | B23H 7/06 219/69.12 |
| 5,047,606 A | 9/1991 | Hiramine | |
| 5,086,203 A * | 2/1992 | Kobayashi | B23H 7/06 219/69.12 |
| 5,834,726 A | 11/1998 | Drouet | |

(Continued)

FOREIGN PATENT DOCUMENTS

| DE | 196 17 894 A1 | 11/1996 |
| EP | 0 920 944 A2 | 6/1999 |

(Continued)

OTHER PUBLICATIONS

Machine translation of Japan Patent No. 2002-18,647, Jun. 2017.*
(Continued)

*Primary Examiner* — Geoffrey S Evans
(74) *Attorney, Agent, or Firm* — Sughrue Mion, PLLC; Richard C. Turner

(57) ABSTRACT

A wire electrical discharge machining apparatus includes an NC control device, and the NC control device determines, during taper machining, whether the type of machining is a type (first type) in which an upper die is located on a workpiece side in comparison with a lower die or a type (second type) in which the upper die is located on the side opposite to the workpiece in comparison with the lower die on the basis of a machining program and corrects the positional relationship between the upper die and the lower die in accordance with the determined type of machining.

7 Claims, 11 Drawing Sheets

(56) References Cited

U.S. PATENT DOCUMENTS

| | | |
|---|---|---|
| 2007/0068905 A1 | 3/2007 | Miyajima et al. |
| 2010/0187204 A1 | 7/2010 | Angelella et al. |
| 2013/0180866 A1 | 7/2013 | Baumeler |

FOREIGN PATENT DOCUMENTS

| | | | | |
|---|---|---|---|---|
| EP | 0 920 945 A2 | | | 6/1999 |
| JP | 61-182729 A | | | 8/1986 |
| JP | 3-73223 A | | | 3/1991 |
| JP | 3-109607 A | | | 5/1991 |
| JP | 4-105820 A | | | 4/1992 |
| JP | 11-165219 A | | | 6/1999 |
| JP | 11-165220 A | | | 6/1999 |
| JP | 2000-24839 A | | | 1/2000 |
| JP | 2002-18647 A | * | | 1/2002 |
| JP | 2005-199358 A | | | 7/2005 |
| JP | 2005-246557 A | * | | 9/2005 |
| JP | 2006-35395 A | | | 2/2006 |
| JP | 2007-83372 A | | | 4/2007 |
| JP | 2007-301666 A | * | | 11/2007 |
| JP | 2008-284613 A | | | 11/2008 |

OTHER PUBLICATIONS

Machine translation of Japan Patent No. 2005-246,557, Jun. 2017.*
Machine translation of Japan Patent No. 2007-301,666, Nov. 2017.*
Japanese Notification of Reason for Refusal for JP 2014-555032 dated Mar. 17, 2015.
International Search Report for PCT/JP2014/058019 dated Jun. 10, 2014.
Communication dated Oct. 18, 2017 from the German Patent and Trademark Office in counterpart application No. 11 2014 006 404.1, 10 pages with translation.

* cited by examiner

WIRE ELECTRICAL DISCHARGE MACHINING APPARATUS AND MACHINING METHOD

CROSS REFERENCE TO RELATED APPLICATIONS

This application is a National Stage of International Application No. PCT/JP2014/058019 filed Mar. 24, 2014, the contents of which are incorporated herein by reference in their entirety.

FIELD

The present invention relates to a wire electrical discharge machining apparatus and a machining method of the wire electrical discharge machining apparatus.

BACKGROUND

Wire electrical discharge machining apparatuses can cut tapers by tilting the wire electrode. Conventional techniques are known that provide correction for the amount of taper angle in accordance with the taper angle (see Patent Literature 1 and Patent Literature 2, for example). Another technique is also known that corrects for errors in a taper angle that occur due to the clearance of the wire guide, by correcting a command movement vector of a machining axis or a taper axis on the basis of the amount of clearance of the wire guide (see Patent Literature 3, for example).

CITATION LIST

Patent Literature

Patent Literature 1: Japanese Patent Application Laid-Open No. H04-105820
Patent Literature 2: Japanese Patent Application Laid-Open No. H11-165219
Patent Literature 3: Japanese Patent Application. Laid-Open No. 2006-035395

SUMMARY

Technical Problem

With a wire electrode tilted, a force to restore the position of the wire is exerted on the upper die and the lower die in a direction opposite to the direction in which the wire electrode is tilted. This force is denoted as a restoring force. Additionally, the wire electrode receives a force in a direction away from the machining surface due to electrical discharge. This force is denoted as a repulsive force. During taper machining, the direction of the restoring force and the direction of the repulsive force may be in agreement with each other or mutually opposite at the upper die and at the lower die in accordance with whether the taper-machining shape is a shape that becomes larger toward the top or a shape that becomes larger toward the bottom. As a result, machining accuracy may vary depending on the taper-machining shape.

The present invention has been achieved in view of the above, and an object of the present invention is to provide a wire electrical discharge machining apparatus and a machining method that achieve a high machining accuracy to a feasible extent regardless of whether the taper-machining shape is a shape that becomes larger toward the top or a shape that becomes larger toward the bottom.

Solution to Problem

In order to solve the above problems and achieve the object, an aspect of the present invention is a wire electrical discharge machining apparatus, including: a wire electrode that generates electrical discharge between the wire electrode and a workpiece to machine the workpiece; an upper die that has a hole to guide the wire electrode and positions the wire electrode above the workpiece; a lower die that has a hole to guide the wire electrode and positions the wire electrode below the workpiece; a drive system that moves any or all of the workpiece, the upper die, and the lower die; and a control device that generates a drive command to operate the drive system on a basis of a machining program that is stored in the control device in advance. The control device determines, during taper machining, whether a type of machining is a type in which the upper die is located on the workpiece side in comparison with the lower die or a type in which the upper die is located on a side opposite to the workpiece in comparison with the lower die on a basis of the machining program and corrects a positional relationship between the upper die and the lower die in accordance with the determined type of machining.

Advantageous Effects of Invention

A wire electrical discharge machining apparatus according to the present invention changes a correction amount in accordance with the positional relationship between the upper die and the lower die even for an identical inclination angle of a wire electrode, thereby achieving high machining accuracy regardless of whether a taper-machining shape is a shape that becomes larger toward the top or a shape that becomes larger toward the bottom.

DESCRIPTION OF EMBODIMENT

A wire electrical discharge machining apparatus and a machining method according to an embodiment of the present invention will now be described in detail with reference to the drawings. The present invention is not limited to the embodiment.

Embodiment

Figure 1:
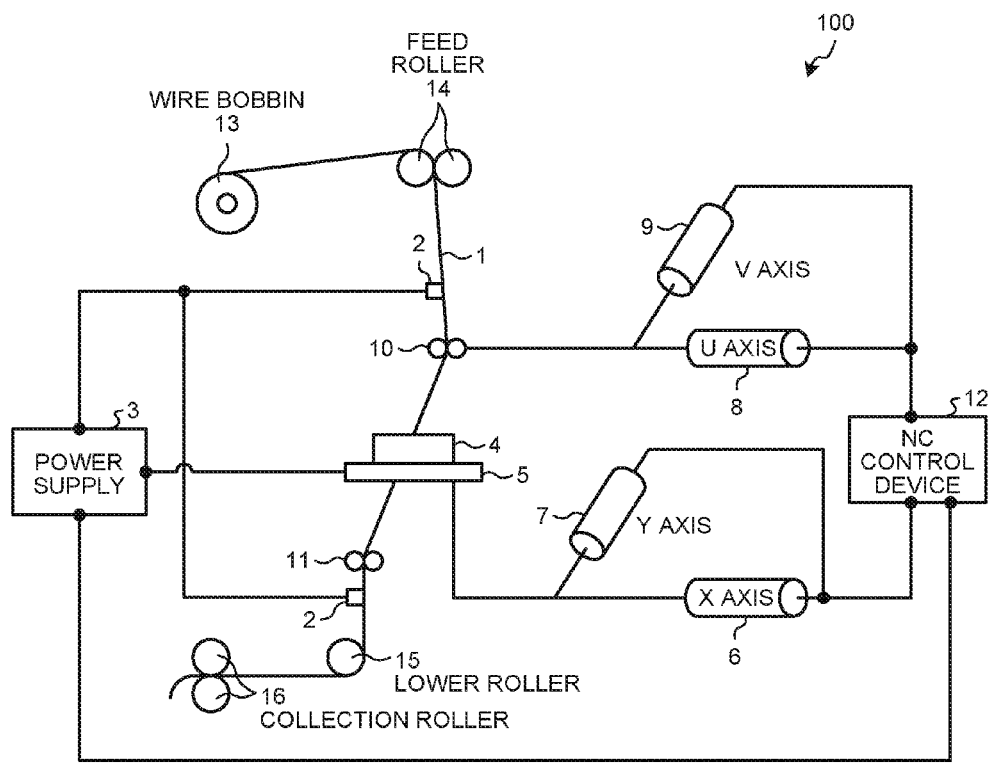
FIG. 1 is a diagram illustrating the configuration of a wire electrical discharge machining apparatus according to an embodiment of the present invention.

FIG. 1 is a diagram illustrating the configuration of a wire electrical discharge machining apparatus according to an embodiment of the present invention. A wire electrical discharge machining apparatus 100 includes a wire electrode 1; a pair of power feed contacts 2 in contact with the wire electrode 1; a machining power supply 3; and a table 5 on which a workpiece 4 is mounted. The wire electrical discharge machining apparatus 100 also includes an X-axis drive device 6, which enables a movement on an X axis; a Y-axis drive device 7, which enables a movement on a Y axis; a U-axis drive device 8, which enables a movement on a U axis; a V-axis drive device 9, which enables a movement on a V axis; and an upper die 10 and a lower die 11, which serve as upper and lower supporting points for the wire electrode 1 when the wire electrode is inclined. The wire electrical discharge machining apparatus 100 also includes an NC control device 12, which controls the machining power supply 3, the X-axis drive device 6, the Y-axis drive device 7, the U-axis drive device 8, and the V-axis drive device 9. The wire electrical discharge machining apparatus 100 also includes a wire bobbin 13, which supplies the wire electrode 1; a feed roller 14, which changes the traveling direction of the wire electrode 1 and supports the wire electrode 1; a lower roller 15, which changes the traveling direction of the wire electrode 1; and a collection roller 16, which collects the wire electrode 1 after the change in direction by the lower roller 15.

In the wire electrical discharge machining apparatus 100 having the configuration as describe above, the wire electrode 1 is fed from the wire bobbin 13 and its direction is changed by the feed roller 14. The wire electrode 1 then passes through a hole of the upper die 10 and a hole of the lower die 11, while passing between the upper die 10 and the lower die 11, the wire electrode 1 performs electrical discharge machining on the workpiece 4. The upper die 10, which has the hole to guide the wire electrode 1, positions the wire electrode above the workpiece 4. The lower die 11, which has the hole to guide the wire electrode 1, positions the wire electrode below the workpiece 4. After passing through the lower die 11, the wire electrode 1 is changed in direction by the lower roller 15 and is collected by the collection roller 16 into a collection box (not shown). The machining power supply 3 applies voltage across each of the power feed contacts 2 and the table 5. The wire electrical discharge machining apparatus 100 machines the workpiece 4 by generating electrical discharge between the workpiece 4 mounted on the table 5 and the wire electrode 1 in contact with the power feed contacts 2.

The X-axis drive device 6, the Y-axis drive device 7, the U-axis drive device 8, and the V-axis drive device 9 constitute a drive system that moves any or all of the workpiece 4, the upper die 10, and the lower die 11. Here, the X-axis drive device 6 and the Y-axis drive device 7 move the table 5, as an example. Thus, when the X-axis drive device 6 and the Y-axis drive device 7 are operated, the positions of the upper die 10 and the lower die 11 move in relation to the workpiece 4 on the KY plane. The U-axis drive device 8 and the V-axis drive device 9 move the upper die 10. Thus, the upper die 10 moves in relation to the lower die 11. The NC control device 12 can achieve taper machining in which the workpiece 4 is machined while the wire electrode 1 is inclined, by controlling the X-axis drive device 6, the Y-axis drive device 7, the U-axis drive device 8, and the V-axis drive device 9. Inclining the wire electrode 1 means to tilt the traveling direction of the wire electrode 1 in a direction different from a direction perpendicular to the KY plane. The direction perpendicular to the KY plane is referred to, in brief, as a vertical direction hereinafter. Any direction along the KY plane is referred to, in brief, as a horizontal direction.

Note that the U-axis drive device 8 and the V-axis drive device 9 may be configured to move the position of the lower die 11, in place of the upper die 10.

Figure 2:
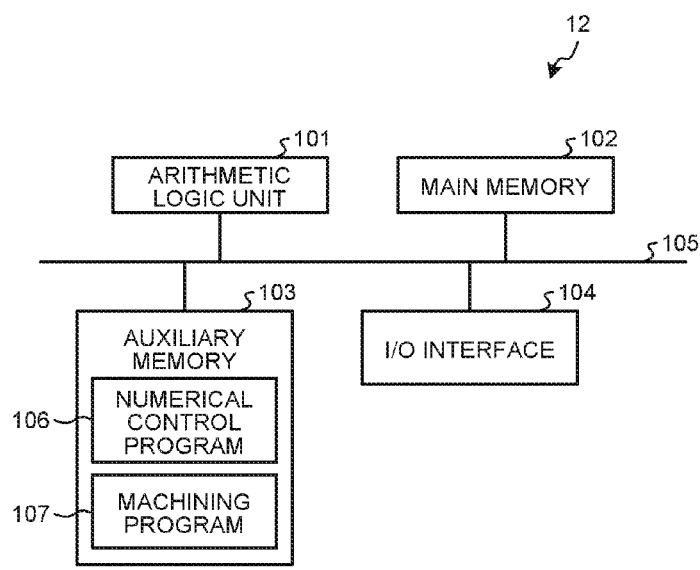
FIG. 2 is a diagram for describing an exemplary hardware configuration of an NC control device.

FIG. 2 is a diagram for describing an exemplary hardware configuration of the NC control device 12. As illustrated, the NC control device 12 includes an arithmetic logic unit 101; a main memory 102; an auxiliary memory 103; an I/O interface 104; and a bus 105. The arithmetic logic unit 101, the main memory 102, the auxiliary memory 103, and the I/O interface 104 are mutually connected via the bus 105.

The arithmetic logic unit 101 is, for example, a CPU (Central Processing Unit). The main memory 102 is a memory that allows faster access than the auxiliary memory 103. The main memory 102 is made up of, for example, a RAM (Random Access Memory). The auxiliary memory 103 is a memory used as a storage area for different types of data. The auxiliary memory 103 is made up of, for example, a ROM (Read Only Memory), a flash memory, an optical disc, a magnetic disk, or a removable memory device, or a combination of any of them. The I/O interface 104 is an interface device that provides connection to the machining power supply 3, the X-axis drive device 6, the Y-axis drive device 7, the U-axis drive device 8, and the V-axis drive device 9.

The auxiliary memory 103 has a numerical control program 106 and a machining program 107, which are stored therein in advance. That is, the auxiliary memory 103 also has a function as a recording medium that has the numerical control program 106 recorded therein. The machining program 107 is a program that describes a procedure to machine the workpiece 4. The numerical control program 106 is a firmware program that achieves an execution environment for the machining program 107. The arithmetic logic unit 101 loads the numerical control program 106 from the auxiliary memory 103 to the main memory 102. The arithmetic logic unit 101 functions as various functional units to be described hereinafter, by executing the numerical control program 106 loaded to the main memory 102.

Figure 3:
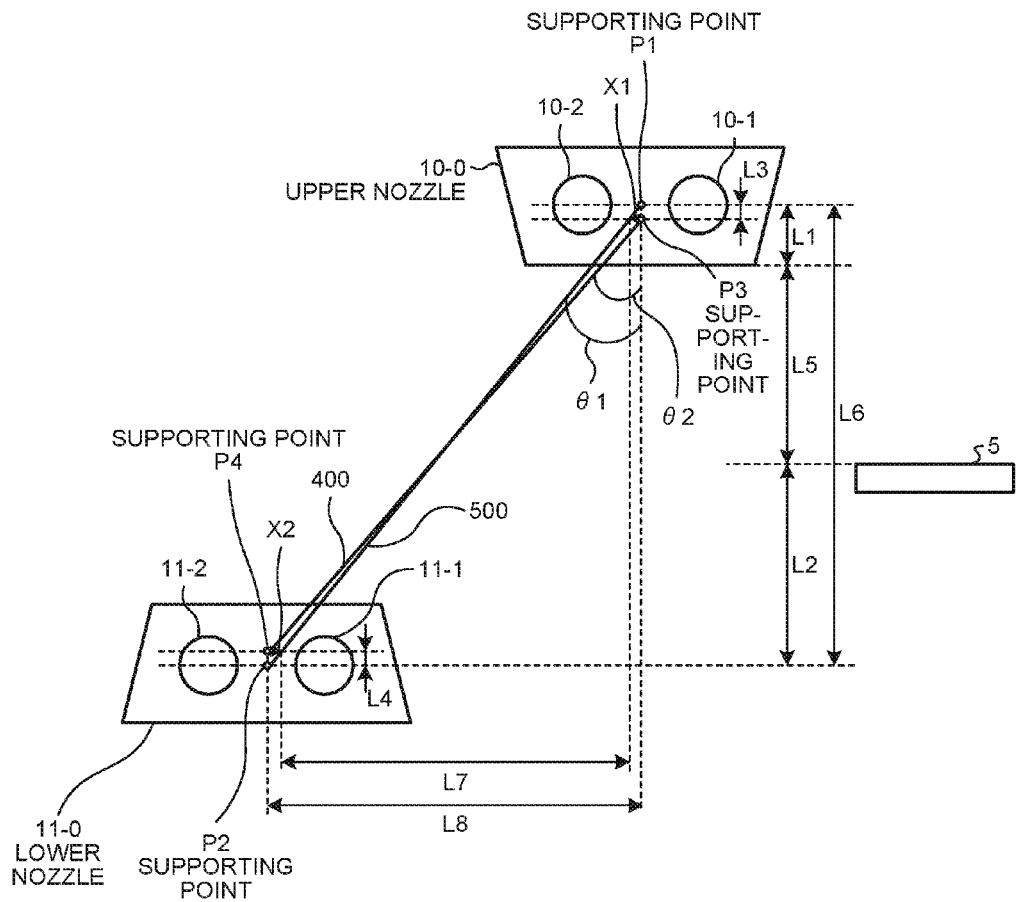
FIG. 3 is a diagram illustrating dimensions relating to taper machining.
Figure 4:
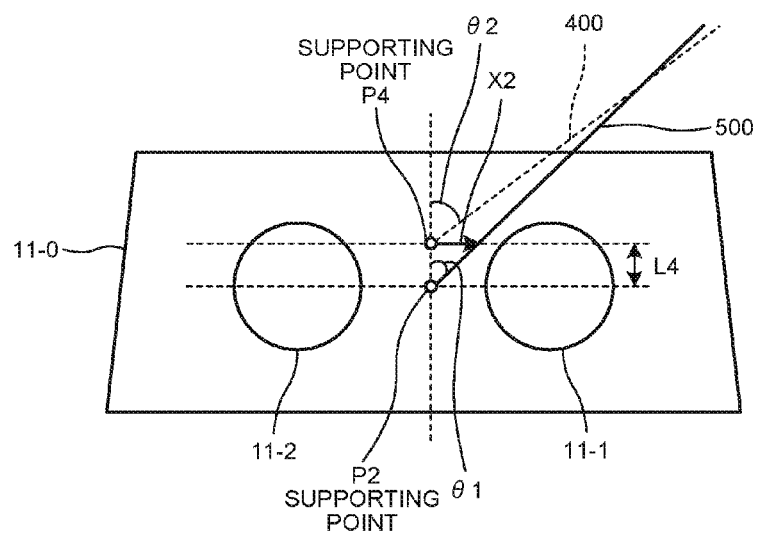
FIG. 4 is a diagram illustrating dimensions relating to the taper machining.

Various dimensions relating to the taper machining are described below. FIGS. 3 and 4 are diagrams illustrating dimensions relating to the taper machining. FIG. 4 is an enlarged view of the lower die 11 and its vicinity illustrated in FIG. 3.

As illustrated, the upper die 10 is housed in an upper nozzle 10-0. The lower die 11 is housed in a lower nozzle 11-0.

A supporting point P1 is a point located on the XY plane at a position that coincides with the center position of the hole of the upper die 10 and located at a position, in the vertical direction, that coincides with a design supporting point of the upper die 10. In this example, the section of the upper die 10 has a shape of two circles arranged horizontally (a section 10-1 and a section 10-2 in FIG. 3); the position of the supporting point P1 in the vertical direction coincides with the center position of the section 10-1 and the center position of the section 10-2. Here, it is assumed that the upper die 10 and the lower die 11 have annular shapes.

A supporting point P2 is a point located on the XY plane at a position that coincides with the center position of the hole of the lower die 11 and located at a position, in the vertical direction, that coincides with a design supporting point of the lower die 11. In this example, the section of the lower die 11 has a shape of two circles arranged horizontally (a section 11-1 and a section 11-2 in FIGS. 3 and 4); the position of the supporting point P2 in the vertical direction coincides with the center position of the section 11-1 and the center position of the section 11-2.

A straight line connecting the supporting point P1 and the supporting point P2 has an inclination angle $\theta 1$ from the vertical direction. An inclination angle hereinafter refers to an inclination angle from the vertical direction.

With the wire electrode 1 inclined, the actual supporting points for the wire electrode 1 at the dies 10 and 11 move in the vertical direction from the supporting point P1 and the supporting point P2, respectively. Additionally, the wire electrode 1 has a diameter that is smaller than the inner diameters of the upper die 10 and the lower die 11; this allows the positions of the wire at the dies 10 and 11 to move in the horizontal direction. Thus, the actual supporting points for the wire electrode 1 at the dies 10 and 11 move also in the horizontal direction. The movement of the wire position in the horizontal direction will be described hereinafter.

With the straight line connecting the supporting point P1 and the supporting point P2 inclined at the angle $\theta 1$, imaginary supporting points P3 and P4 based on the actual angle of the wire electrode 1 are defined. In FIGS. 3 and 4, a straight line 400 is a straight line along the inclined portion of the wire electrode 1, and the supporting point P3 is a point of intersection of a straight line passing through the center position of the hole of the upper die 10 and extending in the vertical direction and the straight line 400. The supporting point P4 is a point of intersection of a straight line passing the center position of the hole of the lower die 11 and extending in the vertical direction and the straight line 400. A straight line 500 is a straight line that connects the supporting point P1 and the supporting point P2.

L1 denotes a distance from the supporting point P1 to the edge of the upper nozzle 10-0 in the vertical direction. L2 denotes a distance from the supporting point P2 to the top surface of the table 5 in the vertical direction. L3 denotes a distance from the supporting point P1 to the supporting point P3 in the vertical direction. L4 denotes a distance from the supporting point P2 to the supporting point P4 in the vertical direction. L5 denotes a distance from the edge of the upper nozzle 10-0 to the top surface of the table 5 in the vertical direction. L6 denotes a length of L1, L2, and L5 added up.

The signs of L3 and L4 are defined as below. If the relationship of "the height of the supporting point P3>the height of the supporting point P1" is satisfied, L3 has a plus sign. If the relationship of "the height of the supporting point P2>the height of the supporting point P4" is satisfied, L4 has a plus sign. The height refers to an amount indicative of a position in the vertical direction, and a higher position in the drawing plane in FIG. 3 has a larger amount. In the example in FIG. 3, both of L3 and L4 have negative values.

To perform the taper machining, a user is allowed to specify the angle $\theta 1$ indirectly by specifying the positions of the dies 10 and 11 from the machining program 107 or to specify the angle $\theta 1$ directly. When movements are made on the U axis and the V axis by the amounts corresponding to the angle $\theta 1$ on the basis of L6, an angle $\theta 2$, which is the actual inclination angle of the wire electrode 1, does not agree with the angle $\theta 1$. For example, if the relationship of "L1+L2>L1+L2+L3+L4" is satisfied, the angle $\theta 2$ is larger than the angle $\theta 1$; if the relationship "L1+L2<L1+L2+L3+L4" is satisfied, the angle $\theta 2$ is smaller than the angle $\theta 1$. Hence, the NC control device 12 stores in advance the distance L3 and the distance L4 with respect to the angle $\theta 1$ as vertical-direction displacement amounts. Then, the NC control device 12 calculates a correction amount X1 and a correction amount X2, which are deviations in the horizontal direction for correcting the straight line 400 passing between the supporting point P3 and the supporting point P4 to the straight line 500 passing through the supporting point P1 and the supporting point P2, on the basis of the vertical-direction displacement amount L3 and the vertical-direction displacement amount L4. The NC control device 12 can perform control such that the actual taper angle agrees with the angle $\theta 1$, by correcting a distance between the dies 10 and 11 in the horizontal direction by the correction amounts X1 and X2.

L8 denotes a distance between the dies 10 and 11 in the horizontal direction before the correction by the correction amounts X1 and X2. The distance between the dies 10 and 11 in the horizontal direction before the correction by the correction amounts X1 and X2 is hereinafter referred to as a pre-correction horizontal distance. L7 denotes a distance between the dies 10 and 11 in the horizontal direction after the correction by the correction amounts X1 and X2. The distance between the dies 10 and 11 in the horizontal direction after the correction by the correction amounts X1 and X2 is referred to as a post-correction distance.

The movement of the wire position in the horizontal direction will now be described.

Figure 5:
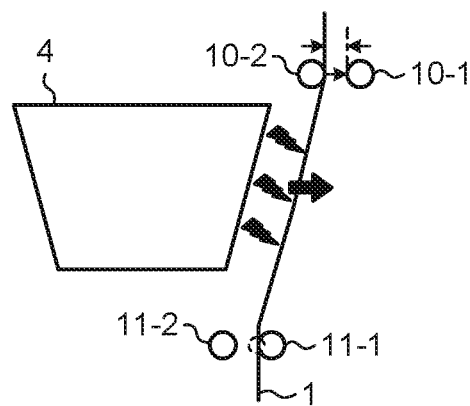
FIG. 5 is a diagram for describing a first type.
Figure 6:
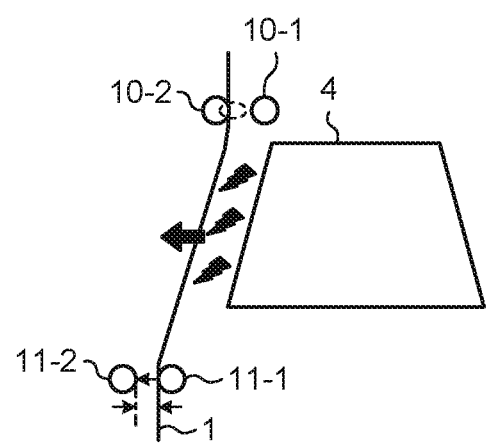
FIG. 6 is a diagram for describing a second type.

In the present embodiment, the taper machining is classified into two types. FIG. 5 is a diagram for describing a first type of the two types of taper machining. FIG. 6 is a diagram for describing a second type of the two types of taper machining. FIGS. 5 and 6 illustrate examples of punch machining. Punch machining refers to machining in which a portion that is cut off (hereinafter referred to as a core) is the product (the workpiece). The punch machining is in contrast with die machining. Die machining refers to machining in which a portion that remains after a core is cut off is the product.

The wire electrode 1 receives a repulsive force in a direction away from the machining surface due to electrical discharge. The machining surface refers to a machining surface of a product. Additionally, the wire electrode 1 receives a restoring force in a direction in which the tilting of the wire electrode 1 is restored. As illustrated in FIG. 5, in the case of the punch machining on a shape that becomes larger toward the top, both of the restoring force and the repulsive force act in directions away from the machining surface of the workpiece 4 at the lower die 11. Hence, at the lower die 11, the wire position is restrained at a position that is the farthest away from the workpiece 4 in the hole of the lower die 11. At the upper die 10, the restoring force acts in a direction toward the machining surface of the workpiece 4, whereas the repulsive force acts in a direction away from the machining surface of the workpiece 4. If the repulsive force is larger than the restoring force, the wire position moves to a position that is the farthest away from the workpiece 4 in the upper die 10. A pattern in which the directions of the restoring force and the repulsive force agree with each other at the lower die 11 and the directions of the restoring force and the repulsive force are mutually opposite at the upper die 10 as described above is defined as the first type. The die machining on a shape that becomes larger toward the bottom also falls into the first type. That is, the upper die 10 is located on the side opposite to the product in comparison with the lower die 11 in the first type.

As illustrated in FIG. 6, in the case of the punch machining on a shape that becomes larger toward the bottom, both of the restoring force and the repulsive force act in directions away from the machining surface of the workpiece 4 at the upper die 10. Hence, at the upper die 10, the wire position is restrained at a position that is the farthest away from the workpiece 4 in the hole of the upper die 10. At the lower die 11, the restoring force acts in a direction toward the machining surface of the workpiece 4, whereas the repulsive force acts in a direction away from the machining surface of the workpiece 4. Hence, the repulsive force is larger than the restoring force, the wire position moves to a position that is the farthest away from the workpiece 4 in the lower die 11. A pattern in which the directions of the restoring force and the repulsive force agree with each other at the upper die 10 and the directions of the restoring force and the repulsive force are mutually opposite at the lower die 11 as described above is defined as the second type. The die machining on a shape that becomes larger toward the top also falls into the second type. That is, the upper die 10 is located on the product side in comparison with the lower die 11 in the second type.

In the case of the first type, the wire position may move in the upper die 10; in the case of the second type, the wire position may move in the lower die 11. Hence, even with an identical taper command angle $\theta 1$, the distance L3 and the distance L4 may differ depending on whether the type of taper machining is the first type or the second type. Thus, in the present embodiment, the NC control device 12 stores the vertical-direction displacement amounts for each of the two types.

Figure 7:
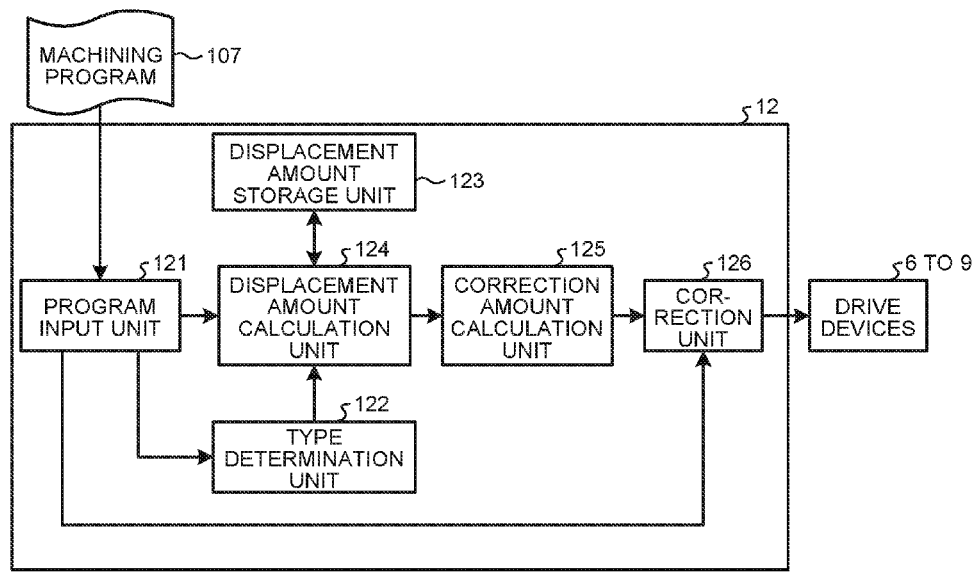
FIG. 7 is a diagram for describing functional units an NC control device.

FIG. 7 is a diagram for describing the functional units of the NC control device 12. As illustrated, the NC control device 12 includes a program input unit 121; a type determination unit 122; a displacement amount storage unit 123; a displacement amount calculation unit 124; a correction amount calculation unit 125; and a correction unit 126. The program input unit 121, the type determination unit 122, the displacement amount calculation unit 124, the correction amount calculation unit 125, and the correction unit 126 are functional units that the arithmetic logic unit 101 achieves on the basis of the numerical control program 106. The displacement amount storage unit 123 is allocated in the main memory 102 or the auxiliary memory 103.

The program input unit 121 reads the machining program 107.

The wire electrode is caused to move on a path obtained by offsetting to the outside of the shape of a product by an amount corresponding to the diameter of the wire electrode 1. The machining program 107 includes a direction command that specifies the direction in which an offset is made is to the right or to the left with respect to the advancing direction of the wire electrode 1.

The machining program 107 can provide a command for the taper machining by a method in which the angle $\theta 1$ is specified directly or by a method in which the angle $\theta 1$ is specified indirectly by specifying the positions of the dies 10 and 11. A command in which the angle 91 is specified directly is denoted as a first taper machining command. A command in which the angle $\theta 1$ is specified indirectly by specifying the positions of the dies 10 and 11 is denoted as a second taper machining command. The second taper machining command includes a UV axis command, which provides positioning on the U axis and the V axis, and an XY axis command, which provides positioning on the X axis and the Y axis.

The program input unit 121 transmits the machining program 107 that has been read to the type determination unit 122, the displacement amount calculation unit 124, and the correction unit 126.

Figure 8:
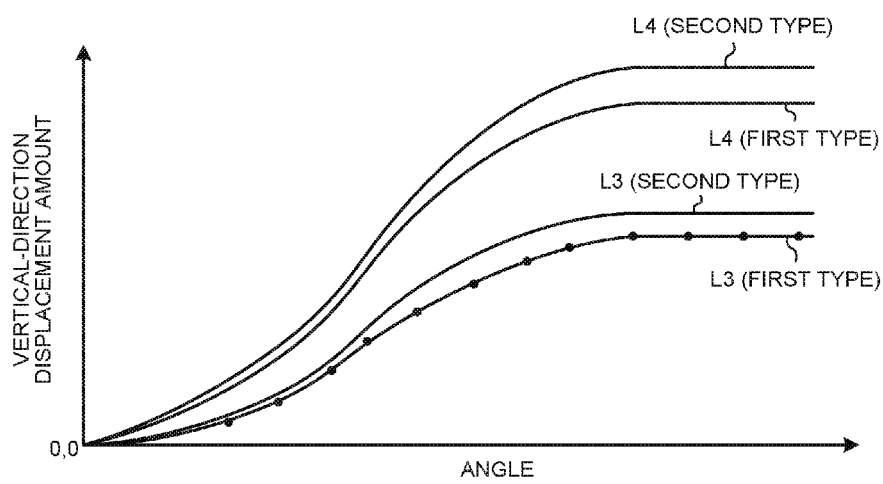
FIG. 8 is a diagram illustrating an example relationship, which is stored in a displacement amount storage unit, of command angles and the types of taper machining, and vertical-direction displacement amounts.

The displacement amount storage unit 123 stores in advance the vertical-direction displacement amounts L3 and L4 for each command angle and each type of taper machining. The displacement amount storage unit 123 may store data in any configuration. For example, the displacement amount storage unit 123 stores the vertical-direction displacement amounts L3 and L4 in the form of a table having the command angles and the types of taper machining as indexes. FIG. 8 is a diagram illustrating an example relationship, which is stored in the displacement amount storage unit 123, of the command angles and the types of taper machining, and the vertical-direction displacement amounts L3 and L4. In this example, the vertical-direction displacement amounts L3 and L4 are stored for each type of taper machining. The vertical-direction displacement amounts L3 and L4 are plotted in solid lines in FIG. 8, although the vertical-direction displacement amounts L3 and L4 are actually stored as discrete data in which the vertical-direction displacement amounts L3 and L4 are indicated for each command angle at predetermined increment intervals. Dots illustrated in L3 of the first type indicate such discrete data.

The discrete data to be stored in the displacement amount storage unit 123 can be obtained by measuring the positions of the supporting points P1 and P2, the wire position, and the angle $\theta 2$ for, for example, the first type and the second type, with the command angle varied at the increment intervals. Alternatively, the data can be obtained from the taper angle of the workpiece 4 actually machined with the command angle varied at the increment intervals for each of the first type and the second type.

The type determination unit 122 determines whether the type of the taper machining is the first type or the second type on the basis of the machining program 107 received from the program input unit 121. The determination processing by the type determination unit 122 is denoted as type determination.

The type determination unit 122 performs the type determination on the basis of the correspondence between the direction indicated by the direction command and the positions of the upper die 10 and the lower die 11. The direction in which the wire electrode 1 advances is the direction in which the position of machining with respect to the workpiece 4 is moved.

Figure 9:
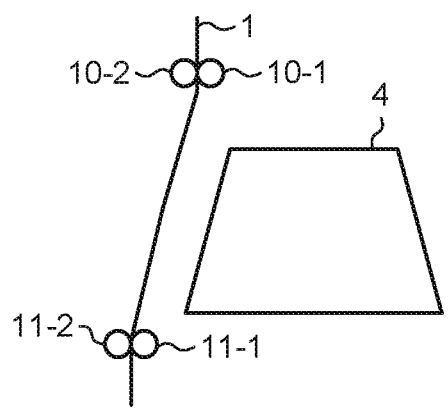
FIG. 9 is a diagram for describing a method of type determination in the case where a first taper machining command is received.
Figure 10:
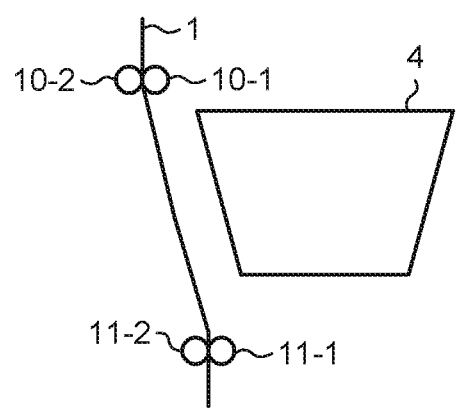
FIG. 10 is a diagram for describing the method of the type determination in the case where the first taper machining command is received.
Figure 11:
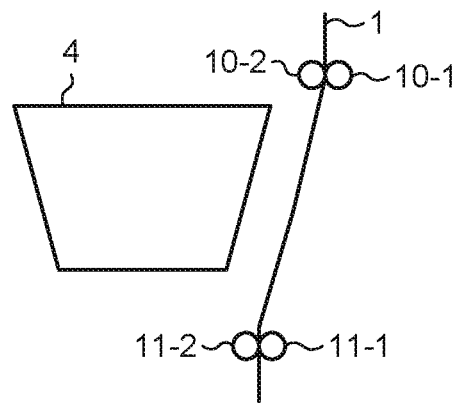
FIG. 11 is a diagram for describing the method of the type determination in the case where the first taper machining command is received.
Figure 12:
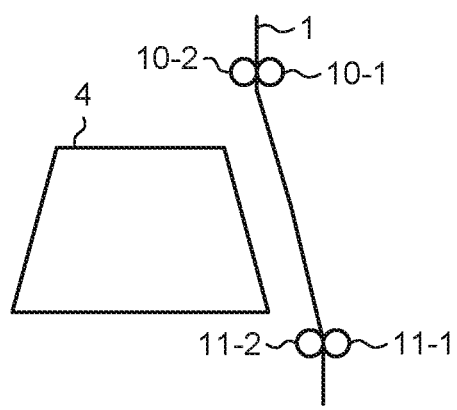
FIG. 12 is a diagram for describing the method of the type determination in the case where the first taper machining command is received.

FIGS. 9 to 12 are diagrams for describing a method of the type determination in the case where the first taper machining command is received. It is assumed in FIGS. 9 to 12 that the wire electrode 1 advances on a perpendicular line drawn with respect to the drawing plane from the front side of the drawing plane toward the back side of the drawing plane. Here, the sign of a command angle is defined as below. If the upper die 10 is located on the right side of the lower die 11 as viewed in the direction in which the wire electrode 1 advances, the sign of a command angle is plus. If the upper die 10 is located on the left side of the lower die 11 as viewed in the direction in which the wire electrode 1 advances, the sign of a command angle is minus. That is, FIGS. 9 and 11 illustrate cases where the signs of the command angles are plus, whereas FIGS. 10 and 12 illustrate cases where the signs of the command angles are minus.

As illustrated in FIG. 9, if the command angle is positive and the wire electrode 1 is offset to the left, the type of taper machining is determined to be the second type. As illustrated in FIG. 10, if the command angle is negative and the wire electrode 1 is offset to the left, the type of taper machining is determined to be the first type. As illustrated in FIG. 11, if the command angle is positive and the wire electrode 1 is offset to the right, the type of taper machining is determined to be the first type. As illustrated in FIG. 12, if the command angle is negative and the wire electrode 1 is offset to the right, the type of taper machining is determined to be the second type.

Figure 13:
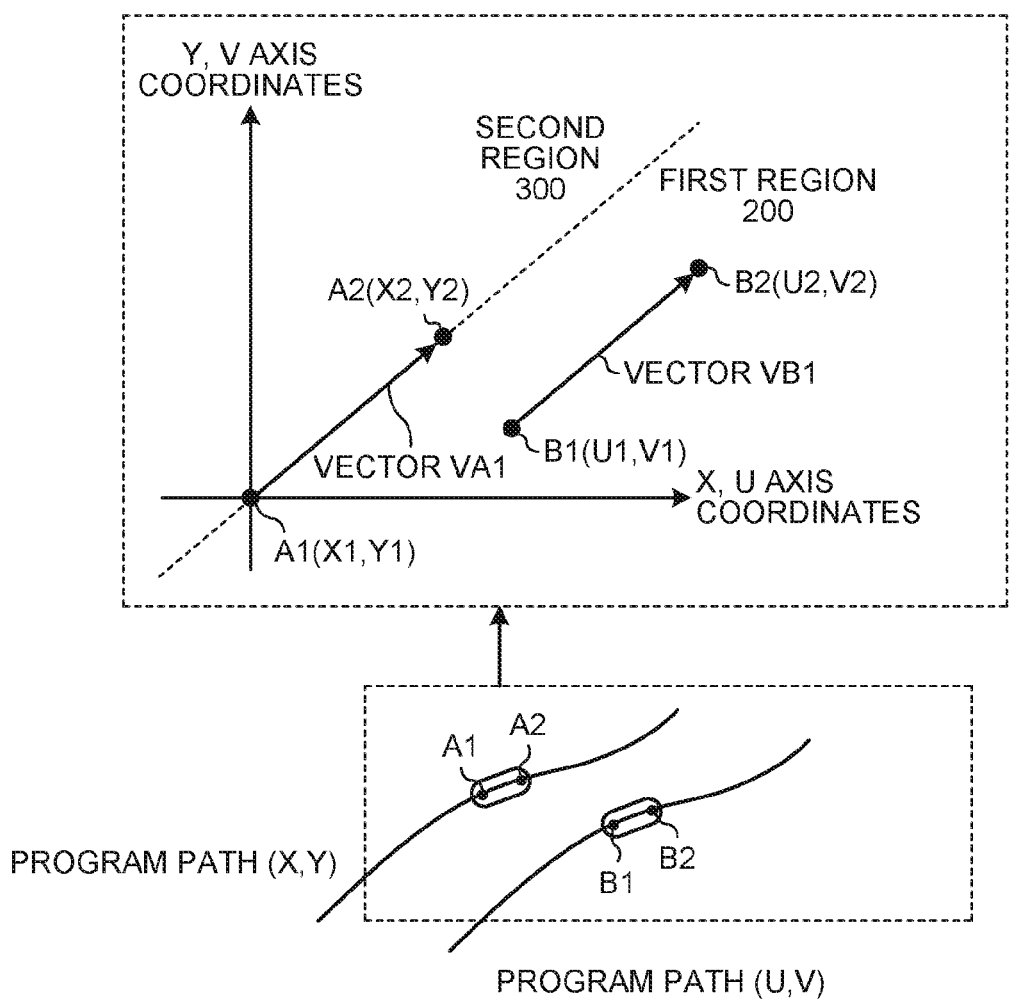
FIG. 13 is a diagram for describing a method of the type determination in the case where a second taper machining command is received.
Figure 14:
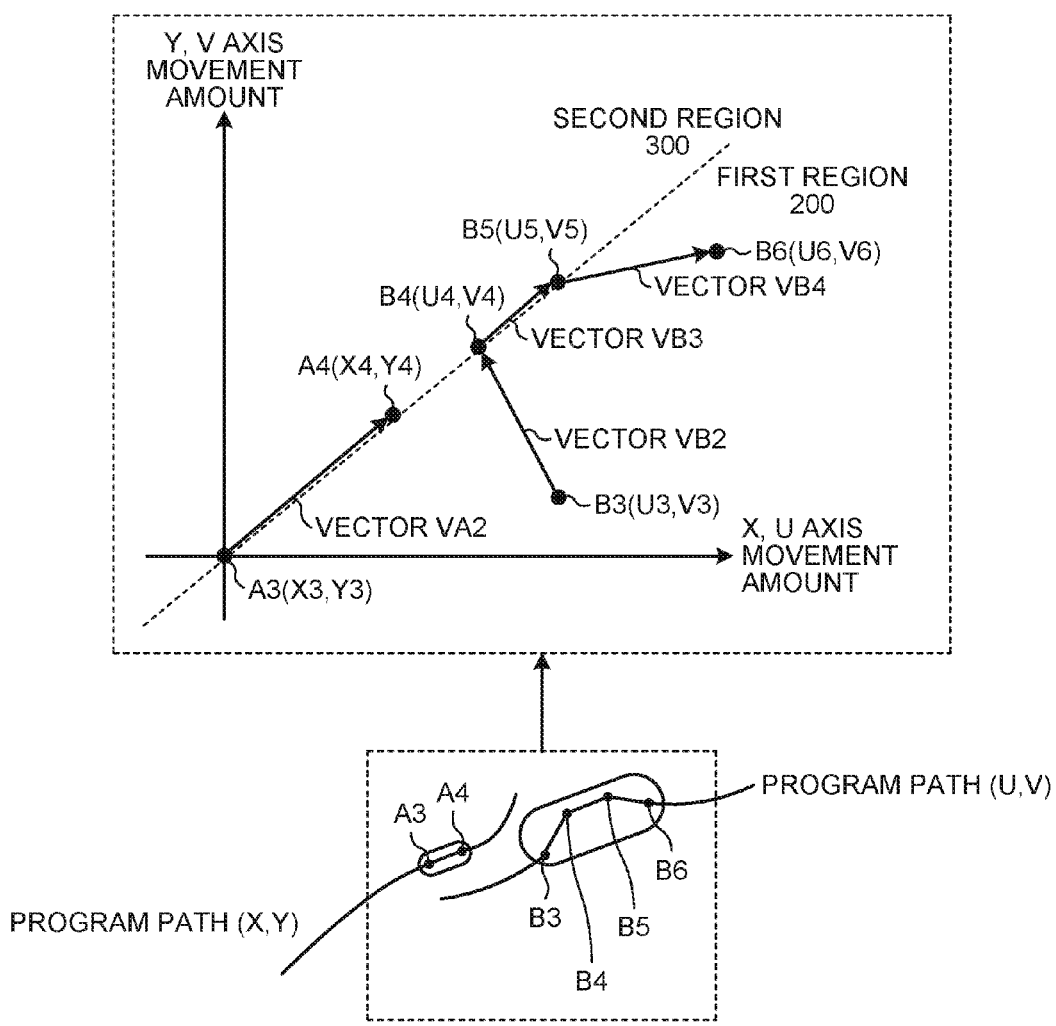
FIG. 14 is a diagram for describing the method of the type determination in the case where the second taper machining command is received.

FIGS. 13 and 14 are diagrams for describing a method of the type determination in the case where the second taper machining command is received. In the case where the second taper machining command is received, the type determination unit 122 calculates a positional relationship of a program path on the UV axes indicated by a UV axis command and a program path on the XY axes indicated by an XY axis command. A program path on the UV axes refers to a path for the upper die 10 and a program path on the XY axes refers to a path for the lower die 11.

FIG. 13 illustrates a case where the second taper machining command includes an XY axis command that enables a movement on the XY axes from a point A1 (X1, Y1) to a point A2 (X2, Y2) and an UV axis command that enables a movement on the UV axes from a point B1 (U1, V1) to a point B2 (U2, V2). The type determination unit 122 superposes the XY coordinate system and the UV coordinate system such that the X axis coincides with the U axis and the Y axis coincides with the V axis. The type determination unit 122 the determines the positional relationship between a vector VA1 resulting from the XY axis command and a vector VB1 resulting from the UV axis command. Specifically, the type determination unit 122 partitions a two-dimensional coordinate space, which is accomplished by the superposition of the XY coordinate system and the UV coordinate system, with a straight line obtained by extending the vector VA1 into a first region 200, which is a region on the right side with respect to the direction of the vector VA1, and a second region 300, which is a region on the left side with respect to the direction of the vector VA1. If the vector VB1 is present in the first region 200, the type determination unit 122 performs a similar type determination to the case in which the command angle is positive. If the vector VB1 is present in the second region 300, the type determination unit 122 performs a similar type determination to the case in which the command angle is negative. If the XY axis command is a command that draws a path of a curved line, it is approximated with a straight line to obtain a vector VA1. If the UV axis command is a command that draws a path of a curved line, it is also handled in a similar manner.

FIG. 14 illustrates a case where the second taper machining command includes an XY axis command that enables a movement on the XY axes from a point A3 (X3, Y3) to a point A4 (X4, Y4) and a UV axis command that enables a movement on the UV axes from a point B3 (U3, V3) via a point B4 (U4, V4) and a point B5 (U5, V5), in the order set forth, to a point B6 (U6, V6). The type determination unit 122 determines the positional relationship between the vector VA2 resulting from the XY axis command and the vector VB2, the vector VB3, and the vector VB4 resulting from the UV axis command. In the example in FIG. 14, the vector VB3 is located on the boundary line between the first region 200 and the second region 300, and the vector VB2 and the vector VB4 are both located in the first region 200. In a case as described above, where a program path resulting from a UV axis command resides temporarily on the boundary line between the first region 200 and the second region 300, if a start point and an end point resulting from one UV axis command are located in the same region, the type determination unit 122 treats all the vectors resulting from the UV axis command as residing in the region. If, with vectors resulting from a UV axis command including the first vector and the last vector, the last vector is present in a region different from that of the first vector, the type determination unit 122 performs the determination on the basis of the region in which the last vector is present. For example, if the point B6 (U6, V6), which is the end point of the vector VB4, is present in the second region 300, the type determination unit 122 performs a similar type determination to the case in which the command angle is negative. Note that the type determination unit 122 may perform the determination not on the basis of the region in which the last vector is present. For example, the type determination unit 122 may perform the determination on the basis of the region in which the first vector is present. Alternatively, the type determination unit 122 may perform the determination on the basis of the start point or the end point.

As described above, the type determination unit 122 performs the type determination on the basis of the direction indicated by the direction command and the positional relationship between the upper die 10 and the lower die 11. The type determination unit 122 transmits the determination result to the displacement amount calculation unit 124.

The displacement amount calculation unit 124 acquires or calculates the command angle θ from the machining program 107 received from the program input unit 121. In the case were the taper machining is indicated with the first taper machining command, the displacement amount calculation unit 124 acquires the command angle θ from the first taper machining command. In the case where taper machining is indicated with the second taper machining command, the displacement amount calculation unit 124 calculates the command angle θ on the basis of an XY axis command and a UV axis command included in the second taper machining command. The displacement amount calculation unit 124 searches the displacement amount storage unit 123 using the command angle θ and the type of taper machining received from the type determination unit 122 to acquire the vertical-direction displacement amounts L3 and L4. In the case where the displacement amount storage unit 123 stores discrete data, the displacement amount calculation unit 124 calculates the vertical-direction displacement amounts L3 and L4 corresponding to the command angle θ by interpolating groups of discrete data before and after the acquired or calculated command angle. The displacement amount calculation unit 124 transmits the command angle θ and the vertical-direction displacement amounts L3 and L4 to the correction amount calculation unit 125.

The correction amount calculation unit 125 calculates the correction amounts X1 and X2 using the command angle θ and the vertical-direction displacement amounts L3 and L4 received from the displacement amount calculation unit 124. The correction amount calculation unit 125 then transmits the calculated correction amounts X1 and X2 to the correction unit 126. The correction amount calculation unit 125 performs the calculation by using, for example, expressions below.

$$X1 = L3 \times \tan\theta \quad (1)$$

$$X2 = L4 \times \tan\theta \quad (2)$$

The correction unit 126 calculates the pre-correction horizontal distance L8 on the basis of the machining program 107 received from the program input unit 121. The correction unit 126 then calculates the post-correction distance L7 by adding the correction amounts X1 and X2 to the calculated pre-correction horizontal distance L8. Subsequently, the correction unit 126 calculates drive commands for the X axis, the Y axis, the U axis, and the V axis such that the horizontal distance between the upper die 10 and the lower die 11 agrees with the post-correction distance L7. Drive commands for the X axis, the Y axis, the U axis, and the V axis are commands having a temporal granularity finer than those of commands described in, for example, the machining program 107; the drive commands are commands per control cycle. A drive command is, for example, a command to specify a movement amount per control cycle.

The correction unit 126 generates a drive command by interpolating each command described in the machining program 107. The correction unit 126 performs the interpolation by a known method. The correction unit 126 also performs smoothing processing before or after the interpolation. The smoothing processing, which may be of any type, is, for example, moving average calculation, Gaussian calculation, or weighted moving average calculation.

The interpolation of each command described in the machining program 107 can be performed by a functional unit before the correction unit 126. For example, the program input unit 121 may perform the interpolation and input a second command that is a command generated by the interpolation to the type determination unit 122, the displacement amount calculation unit 124, and the correction unit 126. In this case, the correction based on changes in the vertical-direction displacement amount L3 and the vertical-direction displacement amount L4 can be performed with a granularity finer than those of commands described in the program input unit 121. The second command may be a command per control cycle; it does not have to be a command per control cycle.

The smoothing processing is performed at any timing after the calculation of the vertical-direction displacement amount L3 and the vertical-direction displacement amount L4.

Figure 15:
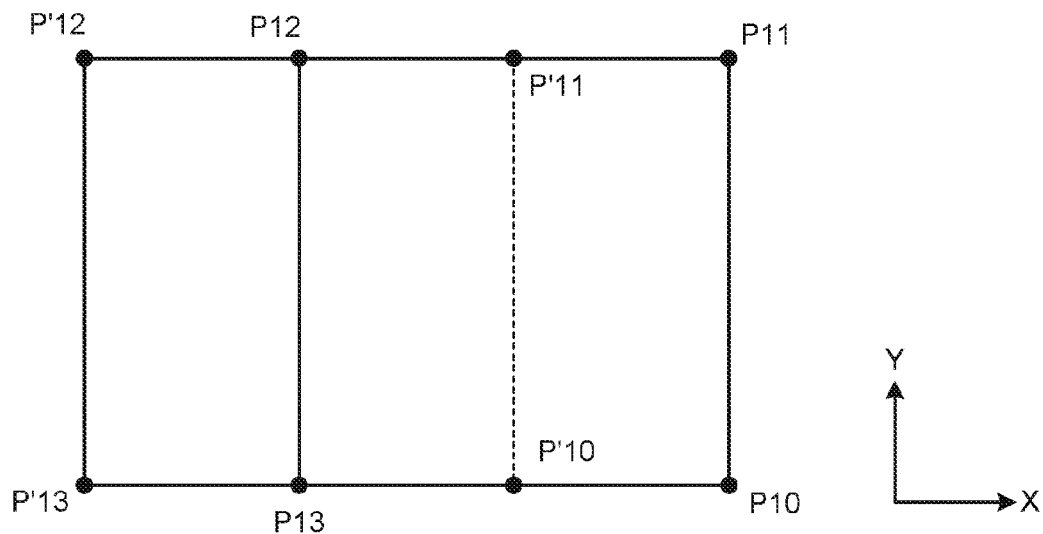
FIG. 15 is a diagram illustrating a first machining shape to be subjected to punch machining.
Figure 16:
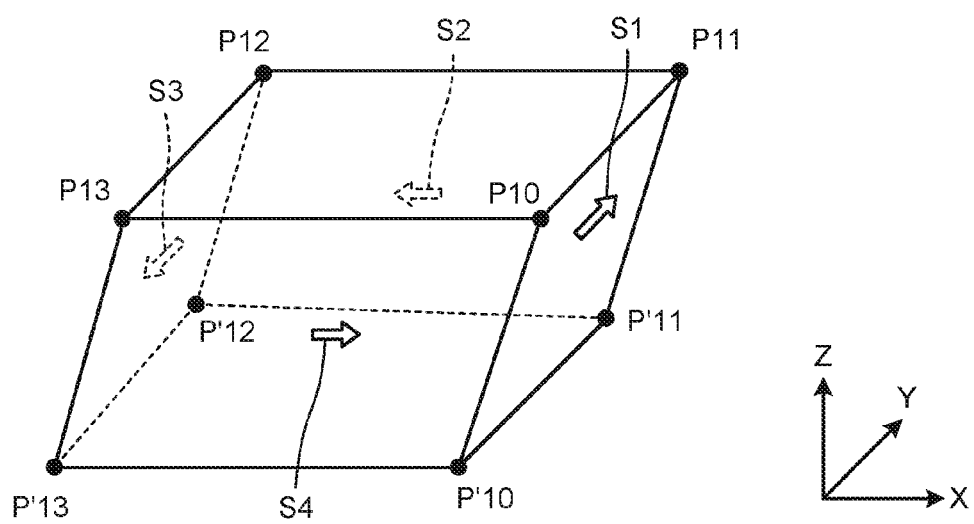
FIG. 16 is a diagram illustrating the first machining shape to be subjected to the punch machining.

FIGS. 15 and 16 are diagrams illustrating an example machining shape to be subjected to the punch machining. The machining shape illustrated in FIGS. 15 and 16 is denoted as a first machining shape. FIG. 15 is a top view of the first machining shape and FIG. 16 is a perspective view of the first machining shape. In FIG. 16, directions in which the wire electrode 1 advances and their sequence are indicated with arrows. The wire electrode 1 is caused to advance from the position of P10-P'10 in the sequence of S1, S2, S3, and S4. The machining process of S1, which is the punch machining on a shape that becomes larger toward the top, falls in the first type of taper machining. The machining process of S3, which is the punch machining on a shape that becomes larger toward the bottom, falls into the second type of taper machining. The machining processes of S2 and 34, in which the wire electrode 1 has zero inclination angle, are straight machining.

Figure 17:
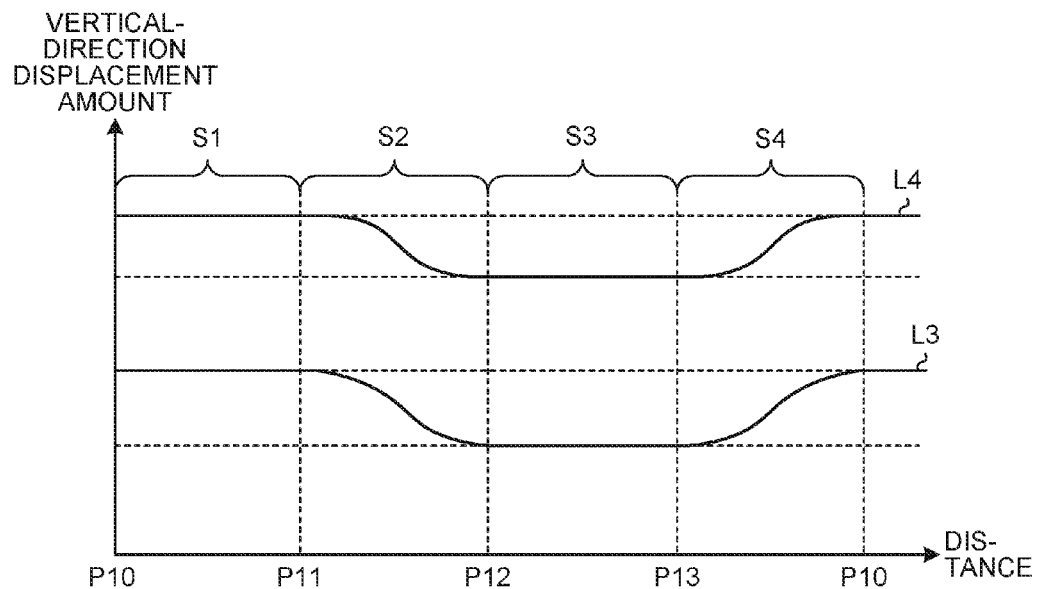
FIG. 17 is a diagram illustrating changes in the vertical-direction displacement amounts during the machining of the first machining shape.

FIG. 17 is a diagram illustrating changes in the vertical-direction displacement amount L3 and the vertical-direction displacement amount L4 during the machining of the first machining shape. As illustrated, the vertical-displacement amount L3 in the machining process of S1 is different from the vertical-direction displacement amount L3 in the machining process of S3. The smoothing processing causes the vertical-direction displacement amount L3 to change smoothly in the machining process of S2, thereby preventing an abrupt change in the vertical-direction displacement amount L3 from the machining process of S1 to the machining process of S3. The vertical-direction displacement amount L4 is also handled in a similar manner.

In the case where the type determination unit 122 performs the type determination for each second command resulting from the interpolation, it can switch the types in the middle of a machining process indicated by commands described in the program input unit 121.

Figure 18:
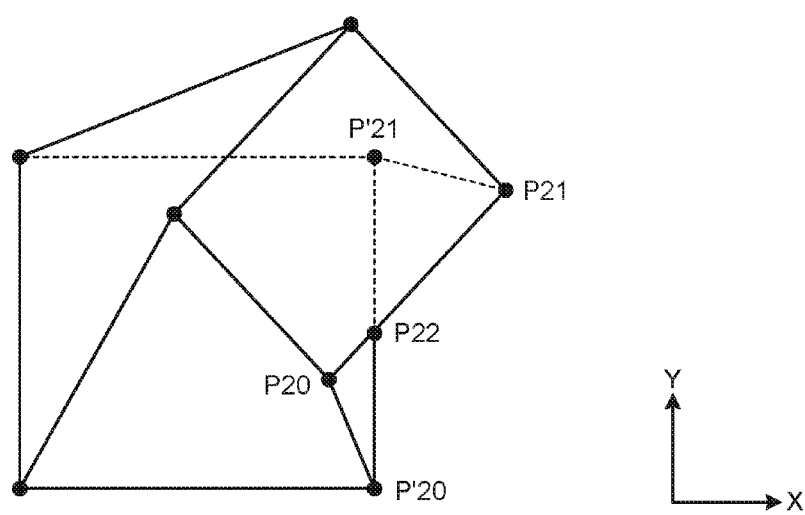
FIG. 18 is a diagram illustrating a second machining shape to be subjected to the punch machining.
Figure 19:
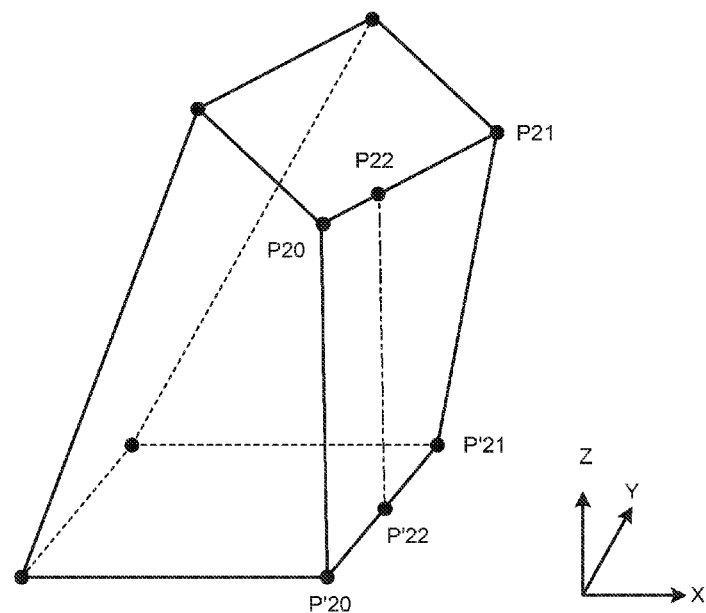
FIG. 19 is a diagram illustrating the second machining shape to be subjected to the punch machining.

FIGS. 18 and 19 are diagrams illustrating another example machining shape to be subjected to the punch machining. The machining shape illustrated in FIGS. 18 and 19 is denoted as a second machining shape. FIG. 18 is a top view of the second machining shape and FIG. 19 is a perspective view of the second machining shape. When a machining process is performed in which the wire position advances from P20-P'20 to P21-P'21 of the second machining shape, the type of taper machining is changed in the middle of the process. The type of taper machining is the second type while the wire position advances from P20-P'20 to P22-P'22. The type of taper machining is the first type while the wire position advances from P22-P'22 to P21-P'21.

Figure 20:
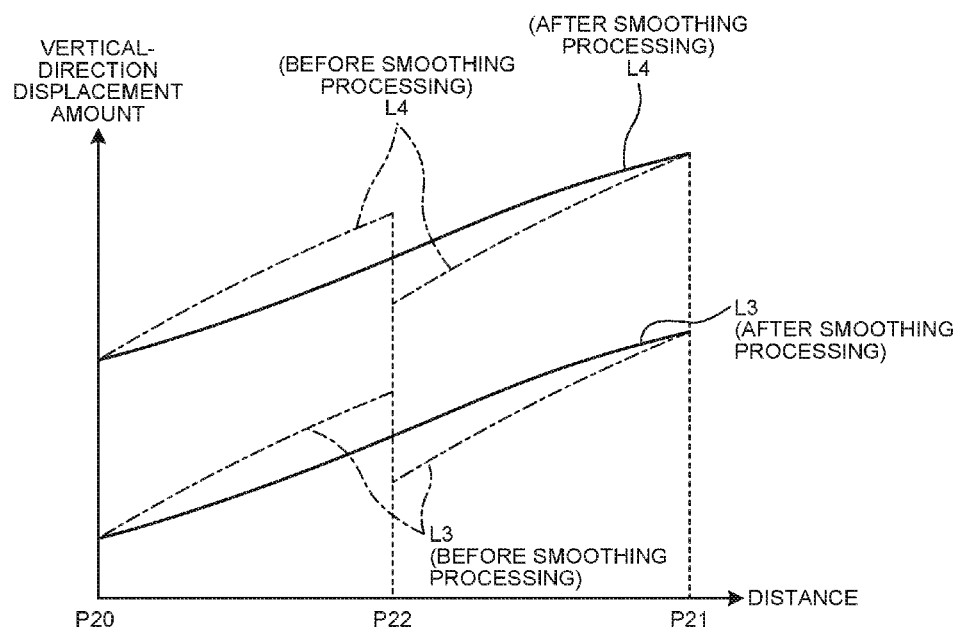
FIG. 20 is a diagram illustrating changes in the vertical-direction displacement amounts during the machining of the second machining shape.

FIG. 20 is a diagram illustrating changes in the vertical-direction displacement amount L3 and the vertical-direction displacement amount L4 during the machining of the second machining shape. Dashed and single-dotted lines indicate the vertical-direction displacement amount L3 and the vertical-direction displacement amount L4 before the smoothing processing; solid lines indicate the vertical-direction displacement amount L3 and the vertical-direction displacement amount L4 after the smoothing processing. As illustrated, if the smoothing processing is not performed, the vertical-direction displacement amount L3 and the vertical-direction displacement amount L4 make discontinuous changes at the point of P22-P'22 and the smoothing processing causes the vertical-direction displacement amount L3 and the vertical-direction displacement amount L4 to make smooth changes.

The vertical-direction displacement amounts L3 and L4 are stored in advance in the displacement amount storage unit 123 for each command angle and each type of taper machining as described above, although the correction amounts X1 and X2 may be stored in advance for each command angle and each type of taper machining.

As described above, the NC control device 12 according to the embodiment of the present invention determines, during the taper machining, whether the type of machining is the second type, in which the upper die 10 is located on the product side in comparison with the lower die 11, or the first type, in which the upper die 10 is located on the side opposite to the product in comparison with the lower die 11, on the basis of the machining program 107. The NC control device 12 then corrects the positional relationship between the upper die 10 and the lower die 11 in accordance with the determination result of the type determination. The wire electrical discharge machining apparatus 100 changes the correction amounts X1 and X2 in accordance with the positional relationship between the upper die 10 and the lower die 11 even for an identical inclination angle of the wire electrode 1 in the manner described above, thereby achieving higher machining accuracy regardless of whether the taper-machining shape is a shape that becomes larger toward the top or a shape that becomes larger toward the bottom, in comparison with the case where the correction amounts X1 and X2 are not changed in accordance with the type.

Additionally, the NC control device 12 calculates the correction amounts X1 and X2 for each type of machining and each inclination angle of the wire electrode 1. Thus, high machining accuracy can be obtained regardless of the inclination angle.

Additionally, the NC control device 12 may further calculate the correction amounts X1 and X2 for each inclination direction. For example, the displacement amount storage unit 123 stores the vertical-direction displacement amounts L3 and L4 for each type of taper machining, each command angle, and each inclination direction. This can provide high machining accuracy even if the vertical-direction displacement amounts L3 and L4 have directional dependency due to the holes of the upper die 10 and the lower die 11 being, for example, rectangular or other reasons.

Furthermore, the machining program 107 includes a direction command that specifies the direction in which an offset is made is to the right or to the left with respect to the advancing direction of the wire electrode 1. The NC control device 12 then performs the type determination on the basis of the direction command. This allows the type of machining to be determined automatically.

REFERENCE SIGNS LIST 1 wire electrode, 2 power feed contact, 3 machining power supply, 4 workpiece, 5 table, 6 X-axis drive device, 7 Y-axis drive device, 8 U-axis drive device, 9 V-axis drive device, 10 upper die, 10-0 upper nozzle, 10-1, 10-2, 11-1, and 11-2 section, 11 lower die, 11-0 lower nozzle, 12 NC control device, 13 wire bobbin, feed roller, 15 lower roller, 16 collection roller, 1.00 wire electrical discharge machining apparatus, 101 arithmetic logic unit, 102 main memory, 103 auxiliary memory, 104 I/O interface, 105 bus, 106 numerical control program, 107 machining program, 121 program input unit, 122 type determination unit, 123 displacement amount storage unit, 124 displacement amount calculation unit, 125 correction amount calculation unit, 126 correction unit, 200 first region, 300 second region, 400 and 500 straight line.

The invention claimed is:

1. A wire electrical discharge machining apparatus, comprising:
a wire electrode that generates electrical discharge between the wire electrode and a workpiece to cut the workpiece into a non-product and a product;
an upper die that has a hole to guide the wire electrode and positions the wire electrode above the workpiece;
a lower die that has a hole to guide the wire electrode and positions the wire electrode below the workpiece;
a drive system that moves at least one among the workpiece, the upper die, and the lower die; and
a controller which comprises a processor coupled to a memory and configured to operate the drive system by generating a drive command based on a machining program that is stored in the memory in advance and is being executed by the processor,
wherein the controller is configured to determine, during taper machining, whether to perform the taper machining in a first machining shape in which a vector from the lower die to the upper die is tilted toward the product with respect to an upward vertical direction or in a second machining shape in which the vector is tilted toward a side opposite to the product with respect to the upward vertical direction based on the machining program, to correct a positional relationship between the upper die and the lower die in accordance with the determining by calculating a first correction amount for the positional relationship for an inclination direction of the vector with respect to the upward vertical direction with the upper die or the lower die used as a reference, and to correct the positional relationship of the upper die and the lower die in a horizontal direction based on the first correction amount.

2. The wire electrical discharge machining apparatus according to claim 1, wherein the controller is configured to calculate the first correction amount for the positional relationship for each type of machining and each inclination angle of the wire electrode and each of the first machining shape and the second machining shape, respectively.

3. The wire electrical discharge machining apparatus according to claim 2, wherein the controller is configured to:
control the memory to store, in advance, a displacement amount in the upward vertical direction between the upper die and the lower die for each inclination angle of the wire electrode and each of the first machining shape and the second machining shape, respectively,
calculate the first correction amount based on the displacement amount,
calculate a second correction amount to correct a distance in the horizontal direction between the upper die and the lower die based on the first correction amount in the upward vertical direction and an inclination angle indicated by the machining program, and
correct the distance in the horizontal direction between the upper die and the lower die by using the second correction amount.

4. The wire electrical discharge machining apparatus according to claim 1, wherein the first machining shape corresponds to a punch machining on a shape that becomes larger toward a top of the workpiece or a die machining on a shape that becomes larger toward a bottom of the workpiece, and the second machining shape corresponds to the punch machining on a shape that becomes larger toward a bottom of the workpiece or the die machining on a shape that becomes larger toward the top of the workpiece.

5. The wire electrical discharge machining apparatus according to claim 1, wherein the machining program includes a direction command to specify whether the wire electrode is offset to right or left with respect to an advancing direction of the wire electrode, and the controller is configured to determine whether to perform the taper machining in the first machining shape or the second machining shape based on the direction command.

6. A machining method of controlling machining of generating electrical discharge between a wire electrode and a workpiece and cutting the workpiece into a non-product and a product to be performed by a control device of a wire electrical discharge machining apparatus, the machining method comprising:

determining, during taper machining, whether to perform the taper machining in a first machining shape in which a vector from a lower die of the wire electrode to an upper die of the wire electrode is tilted toward the product with respect to an upward vertical direction or in a second machining shape in which the vector is tilted toward a side opposite to the product with respect to the upward vertical direction based on a machining program; and correcting a positional relationship between the upper die and the lower die in accordance with the determining by calculating a correction amount for the positional relationship for an inclination direction of the vector with respect to the upward vertical direction with the upper die or the lower die used as a reference; and machining the workpiece by further correcting the positional relationship of the upper die and the lower die in a horizontal direction based on the correction amount.

7. The machining method according to claim 6, wherein the first machining shape corresponds to a punch machining on a shape that becomes larger toward a top of the workpiece or a die machining on a shape that becomes larger toward a bottom of the workpiece, and the second machining shape corresponds to the punch machining on a shape that becomes larger toward a bottom of the workpiece or the die machining on a shape that becomes larger toward the top of the workpiece.

* * * * *